W. H. CARRIER.
SAFETY MEANS FOR HUMIDITY REGULATING APPARATUS.
APPLICATION FILED AUG. 7, 1912.
1,138,084.
Patented May 4, 1915.
2 SHEETS—SHEET 1.
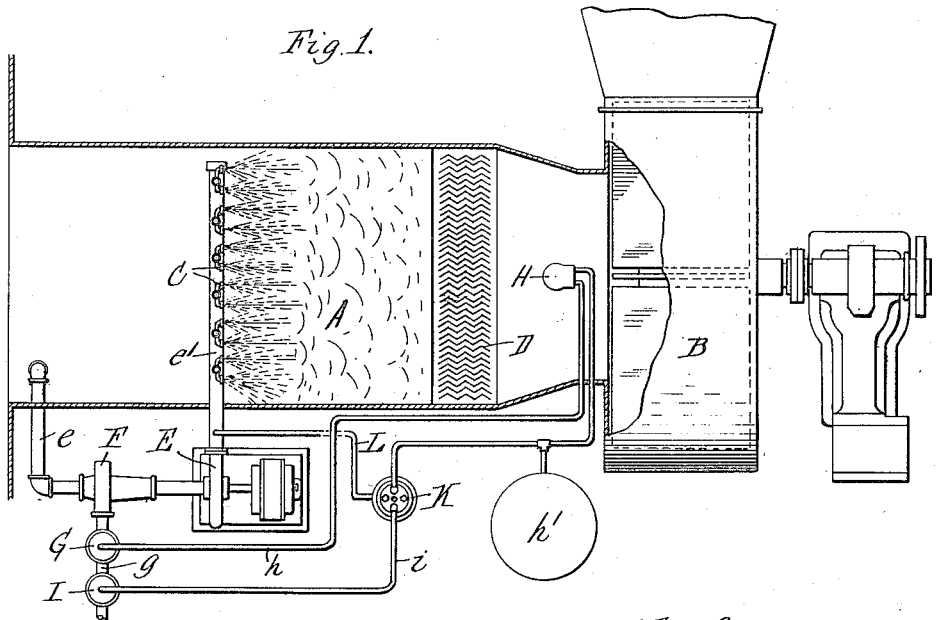
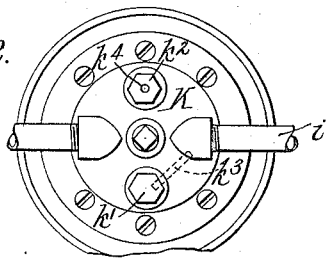
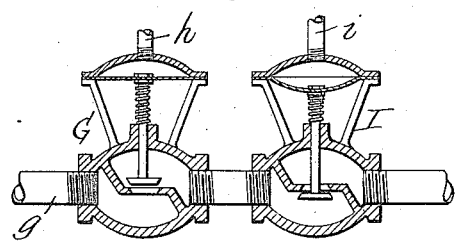
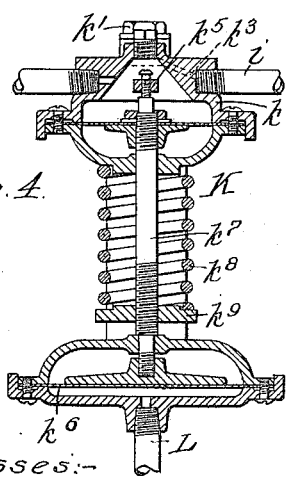
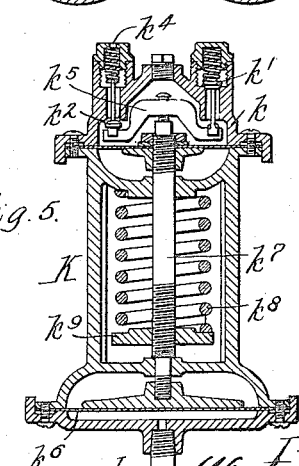

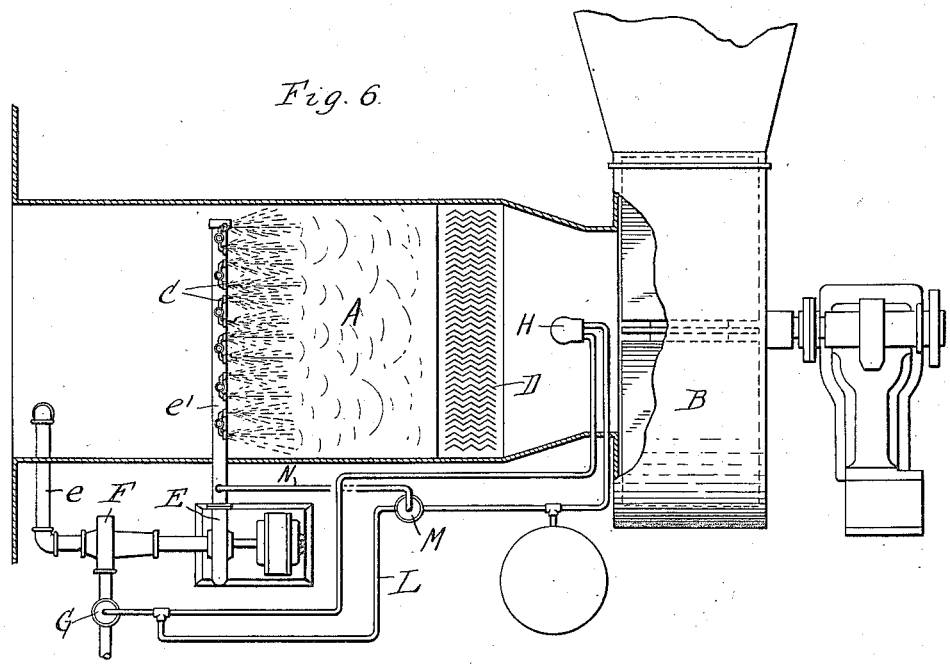
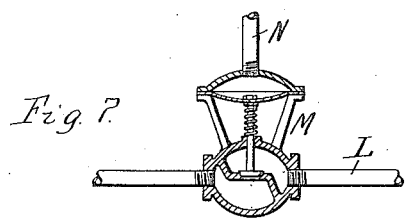

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

SAFETY MEANS FOR HUMIDITY-REGULATING APPARATUS.

1,138,084.  Specification of Letters Patent.  Patented May 4, 1915.

Application filed August 7, 1912. Serial No. 713,855.

*To all whom it may concern:*

Be it known that I, WILLIS H. CARRIER, a citizen of the United States, residing at Buffalo, in the county of Erie and State of New York, have invented a new and useful Improvement in Safety Means for Humidity-Regulating Apparatus, of which the following is a specification.

This invention relates more particularly to improvements in humidity regulating systems of that kind in which the water for humidifying the air is heated, or the temperature in the humidifying apparatus is otherwise regulated so as to saturate the air at a definite temperature depending upon the desired humidity in the room to which the humidified air is supplied. U. S. Patent No. 854,270 granted May 21, 1907, to myself, assignor to Buffalo Forge Company, discloses a humidity regulating system of this sort in which the temperature of the water for saturating the air is regulated by a thermostat which responds to fluctuations in the temperature of the humidified air and controls the pressure of air for actuating means by which the temperature of the water is regulated as may be necessary to maintain the required temperature in the humidifier. A failure in either the water or the air pressure from whatever cause it may arise, will result in an abnormal rise in the temperature in the humidifier and an excessive humidity.

The object of the invention is to provide humidity regulating systems of this nature, in which the humidity is dependent upon the temperature maintained in the humidifier, with safety means for preventing excessive humidity of the air in the event of the failure of the water pressure, or, in one embodiment of the invention, in the event of the failure of either the water pressure or the pressure of the air which is used for actuating the temperature regulating means.

The safety means forming the subject of this invention is applicable to said patented system and also to systems in which the temperature in the humidifying apparatus is regulated in other ways, as, for example, by injecting steam into the water before the water is sprayed into the air, and by supplying steam directly to the humidifying chamber.

Two embodiments of the invention are disclosed in this application. In the first, the supply of steam for heating the water is regulated under normal conditions by a valve actuated by compressed air, the pressure of which is varied by a thermostat in response to changes in the humidified air in such a way that an increase in air pressure due to a rise in the temperature of the humidified air will decrease the supply of steam, while a decrease in air pressure due to a drop in the temperature of the humidified air will cause an increased supply of steam. The steam supply line is also provided with a reversely acting valve which is held open by air pressure supplied through a valve which is normally held open by the pressure of the spray water. The reversely acting valve will close and shut off the steam upon a predetermined drop in the pressure of the air which actuates it, and this reduction in pressure may be caused either by a failure in the air pressure itself or a failure in the water pressure which will cause the water-actuated valve to operate to reduce the pressure of the actuating air. A failure in either the air or the water pressure from any cause will, therefore, result in the steam being shut off and will prevent excessive humidifying.

In the second embodiment of the invention disclosed herein, which operates only in the event of a failure in the water pressure, a valve which is normally held closed by the water pressure will operate, if the water pressure fails, to admit air pressure directly to the thermostatically controlled steam supply valve so as to shut off the steam and prevent excessive humidifying.

In the accompanying drawings, consisting of two sheets: Figure 1 is a sectional plan, partly diagrammatic, of a humidifying apparatus provided with safety means arranged according to the first mentioned embodiment of the invention. Fig. 2 is a plan of the water pressure actuated device. Fig. 3 is a section of the steam regulating valves. Figs. 4 and 5 are sections in different planes of the water pressure actuated device. Fig. 6 is a view similar to Fig. 1 of the second embodiment of the invention. Fig. 7 is a section of the water actuated valve employed in the construction shown in Fig. 5.

Like reference characters refer to like parts in the several figures.

The apparatus shown in Figs. 1–5 of the drawings comprises a spray chamber or casing A through which air is caused to flow by a fan B, nozzles C for spraying water into the spray chamber A for humidifying the air, an eliminator D for separating the free water from the humidified air, a pump E which draws the spray water by a pipe $e$ from a collecting well in the bottom of the spray chamber and delivers it by a pipe $e'$ to the spray nozzles, and a steam injector or heater F connected with the suction pipe $e$ for heating the spray water. The supply of steam to the injector is regulated by a diaphragm valve G in the steam pipe $g$ actuated by compressed air, the pressure of which is controlled by a thermostat H which is influenced by and responds to changes in the temperature of the humidified air. The thermostat controls the pressure of the air in a pipe $h$ leading from a tank $h'$, or other source of compressed air, to the actuating diaphragm of the steam valve G and operates automatically to increase the air pressure in the pipe $h$ and cause the steam valve to close more or less and reduce the steam supply when the temperature of the humidified air rises above the predetermined temperature which it is desired to maintain, and to decrease the air pressure and cause the steam valve to open and increase the steam supply when the temperature of the humidified air drops below said predetermined temperature.

The humidifying apparatus as thus described except in combination with the safety means presently described forms no part of this invention and it may be of the construction described, which is well known, or of any other known or suitable construction in which the heating medium for regulating the temperature of the humidified air is adapted to be controlled by the safety means as hereinafter explained.

I represents a second diaphragm valve controlling the steam supply pipe $g$. This valve is actuated by air pressure in a pipe $i$ connecting with the compressed air supply and operates reversely to the regulating valve G, that is, it is held open by the air pressure and will close and shut off the steam if the air pressure in the pipe $i$ fails.

The passage of air to the shut off valve I through the pipe $i$ is controlled by a valve or device K adapted to relieve the air pressure in the pipe $i$ upon a failure in the water pressure. In the construction shown, the device comprises a casing $k$ connected in the pipe $i$ and provided with oppositely arranged valves $k'$ and $k^2$, the former controlling a passage $k^3$ connecting the interior of the casing $k$ with the pipe $i$, and the latter controlling a relief passage $k^4$ leading to the atmosphere. These valves $k'$ $k^2$ are connected by a yoke or lever $k^5$ operated by a diaphragm $k^6$, which is actuated by the pressure of the spray water and is connected to the yoke by a plunger $k^7$. The movement of the plunger by the diaphragm is opposed by a spring $k^8$, the tension of which can be adjusted by a nut $k^9$. Water pressure is communicated to the diaphragm $k^6$ by a pipe L connecting the diaphragm chamber with the water supply pipe $e'$ for the spray nozzles. In the normal operation of the humidifying apparatus the water pressure on the diaphragm $k^6$ will hold the valve $k'$ open and the valve $k^2$ closed, thus permitting the passage of compressed air to the diaphragm of the shut off valve I. If, however, the water pressure drops below a desired minimum determined by the adjustment of the spring $k^8$, the valve $k'$ will be seated and intercept the supply of compressed air to the shut off valve I, and the relief valve $k^2$ will be opened and relieve the air pressure on the shut off valve through the passage $k^4$, thus allowing the shut off valve to close and cut off the supply of steam to the water heater G.

The apparatus constructed as above described will therefore operate to cut off the steam supply to the water heater upon a failure of either the water or the air pressure.

The pressure actuated device K *per se* is not a part of this invention and any other device adapted to relieve the air pressure on the shut off valve upon a failure of the water pressure could be used.

In the apparatus shown in Figs. 6 and 7, the steam shut off valve I and the water pressure actuated device K are omitted, and an air pipe L connects the diaphragm of the steam supply valve G directly with the compressed air supply. The passage of air through this pipe is controlled by a valve M of any suitable sort which is normally held closed by the pressure of the spray water communicated to the actuating diaphragm thereof through a pipe N connecting with the water supply pipe $e'$. If the water pressure fails, the valve M will open and the pressure of the air thus admitted to the diaphragm of the steam valve G will close this valve and shut off the steam supply.

I claim as my invention:

1. In a humidifying apparatus, the combination with water supply means, heating means, and means which normally regulate the heating means to control the temperature in the humidifier, of means which are controlled by the water pressure and act upon a failure in the water pressure to render said heating means inactive, substantially as set forth.

2. In a humidifying apparatus, the combination with water supply means, heating means, and fluid actuated means which normally regulate the heating means to control the temperature in the humidifier, of means which are controlled by the water pressure and act upon a failure in the water pressure to alter the effect of said heating means, substantially as set forth.

3. In a humidifying apparatus, the combination with water supply means, heating means, and fluid actuated means which normally regulate the heating means to control the temperature in the humidifier, of means which are controlled by both said fluid pressure and the water pressure and act upon a failure in either the fluid pressure or the water pressure to render said heating means inactive, substantially as set forth.

4. In a humidifying apparatus, the combination with water supply means, steam supply means, and fluid pressure actuated means which normally regulate the steam supply to control the temperature in the humidifier, of means which act upon a failure of either the water pressure or said fluid pressure to shut off the steam, substantially as set forth.

5. In a humidifying apparatus, the combination with water supply means, a steam supply valve, and means which operate said steam supply valve in response to changes in the temperature of the humidified air for controlling the temperature in the humidifier, of means controlled by the water pressure which act upon a failure of the water pressure to shut off the steam, substantially as set forth.

6. In a humidifying apparatus, the combination with water supply means, a thermostat which responds to changes in the temperature of the humidified air, and heating means which are normally actuated by fluid pressure controlled by said thermostat for regulating the temperature in the humidifier, of means controlled by the water pressure which act upon a failure of the water pressure to alter the action of said heating means, substantially as set forth.

7. In a humidifying apparatus, the combination with water supply means, a thermostat which responds to changes in the temperature of the humidified air, and heating means which are normally actuated by fluid pressure controlled by said thermostat for regulating the temperature in the humidifier, of means which are normally held inactive by said fluid pressure and act upon a failure of either said fluid pressure or the water pressure to alter the action of said heating means, substantially as set forth.

8. In a humidifying apparatus, the combination with water supply means, a thermostat which responds to changes in the temperature of the humidified air, and heating means which are normally controlled by fluid pressure under the control of said thermostat for regulating the temperature in the humidifier, of a device actuated by said fluid pressure for rendering said heating means inactive, and a valve which controls the passage for conveying said fluid pressure to said device and is normally held open by the water pressure and which closes upon a failure of the water pressure.

9. In a humidifying apparatus, the combination with water supply means, a thermostat which responds to changes in the temperature of the humidified air, and a steam supply valve which is normally actuated by fluid pressure controlled by said thermostat for regulating the temperature in the humidifier, of a shut off valve for the steam which is normally held open by said fluid pressure, and a valve which controls the passage for said fluid pressure and is normally held open by the water pressure and which closes upon a failure of the water pressure, substantially as set forth.

10. In a humidifying apparatus, the combination with water supply means, heating means, and fluid-pressure-controlled means which normally regulate said heating means to control the temperature in the humidifier, of means which act automatically upon an abnormal pressure condition in either the water pressure or said fluid pressure to alter the heating effect of said heating means.

11. In a humidifying apparatus, the combination with supply means for water under pressure, heating means, and fluid-pressure-controlled means which normally regulate said heating means to control the temperature in the humidifier, of means which act automatically upon an abnormal pressure condition in one of said pressures to alter the heating effect of said heating means.

Witness my hand this 31st day of July, 1912.

WILLIS H. CARRIER.

Witnesses:
  H. C. RICE,
  C. A. BOOTH.